Dec. 18, 1962     H. E. FELLOWS     3,068,537
FOUNDRY SYSTEM AND APPARATUS
Filed Sept. 9, 1957     13 Sheets-Sheet 1

INVENTOR.
HARRISON E. FELLOWS
BY Wheeler, Wheeler & Wheeler
ATTORNEYS

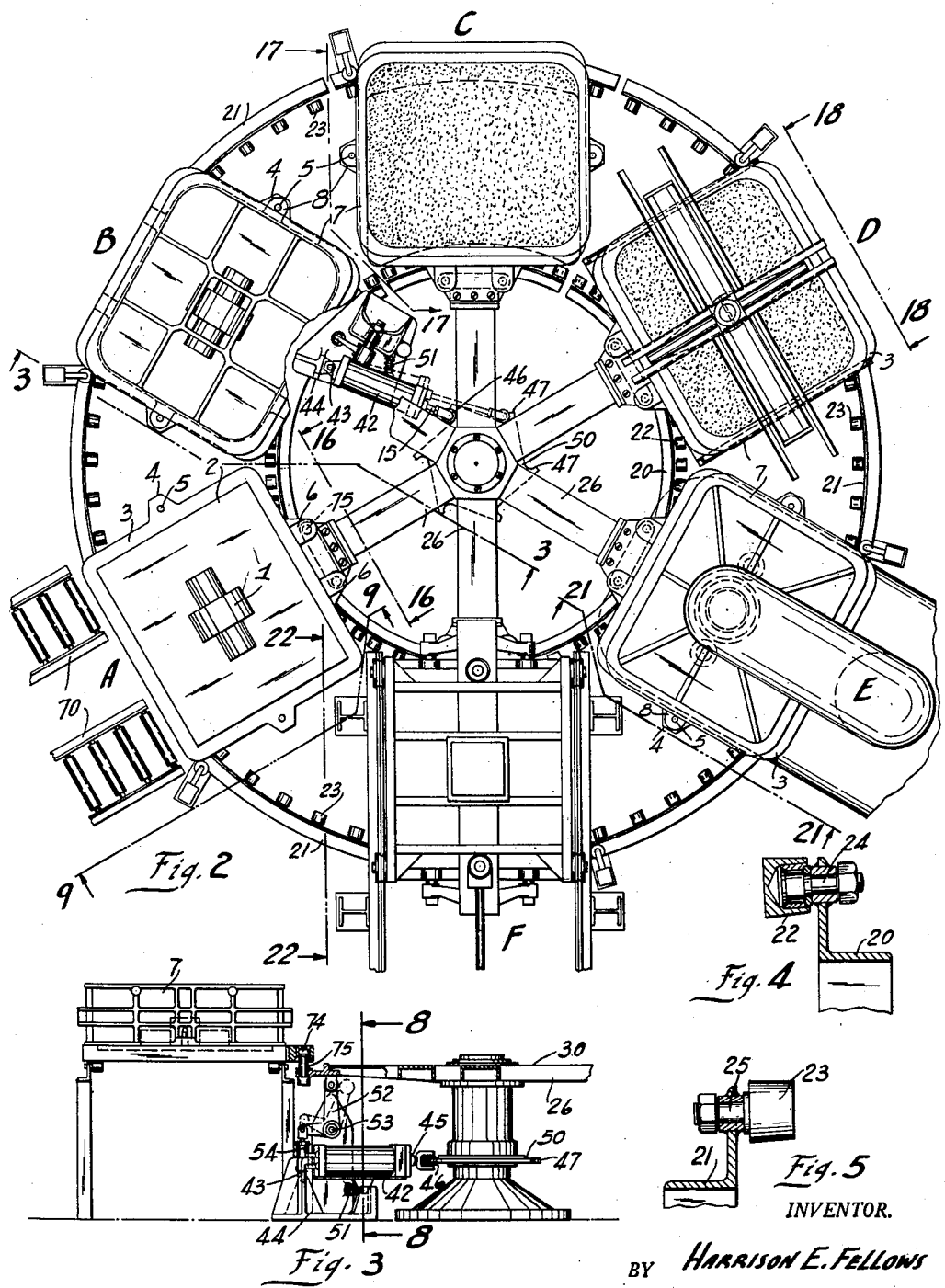

Dec. 18, 1962  H. E. FELLOWS  3,068,537
FOUNDRY SYSTEM AND APPARATUS
Filed Sept. 9, 1957  13 Sheets-Sheet 3

INVENTOR.
BY *Harrison E. Fellows*
*Wheeler, Wheeler & Wheeler*
ATTORNEYS

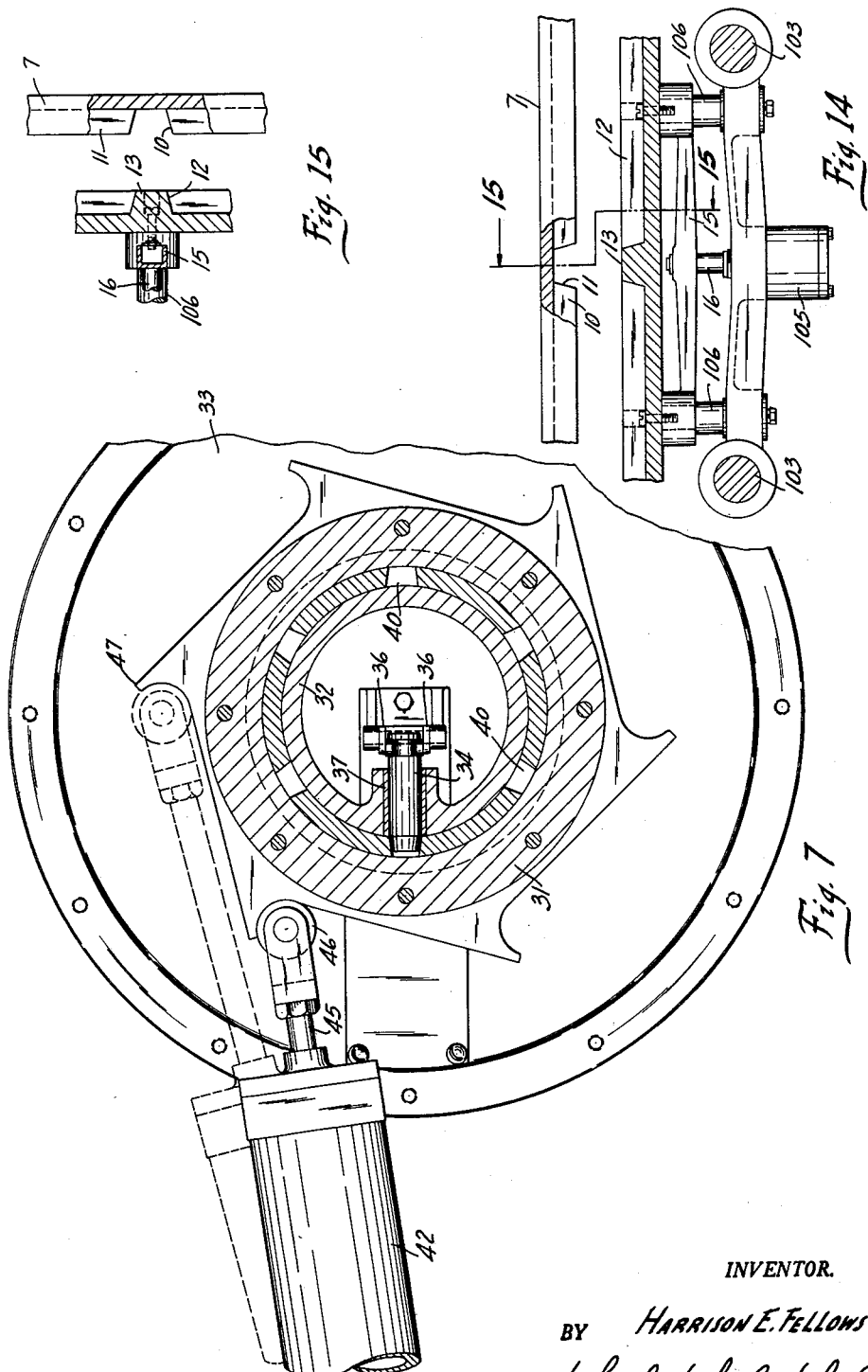

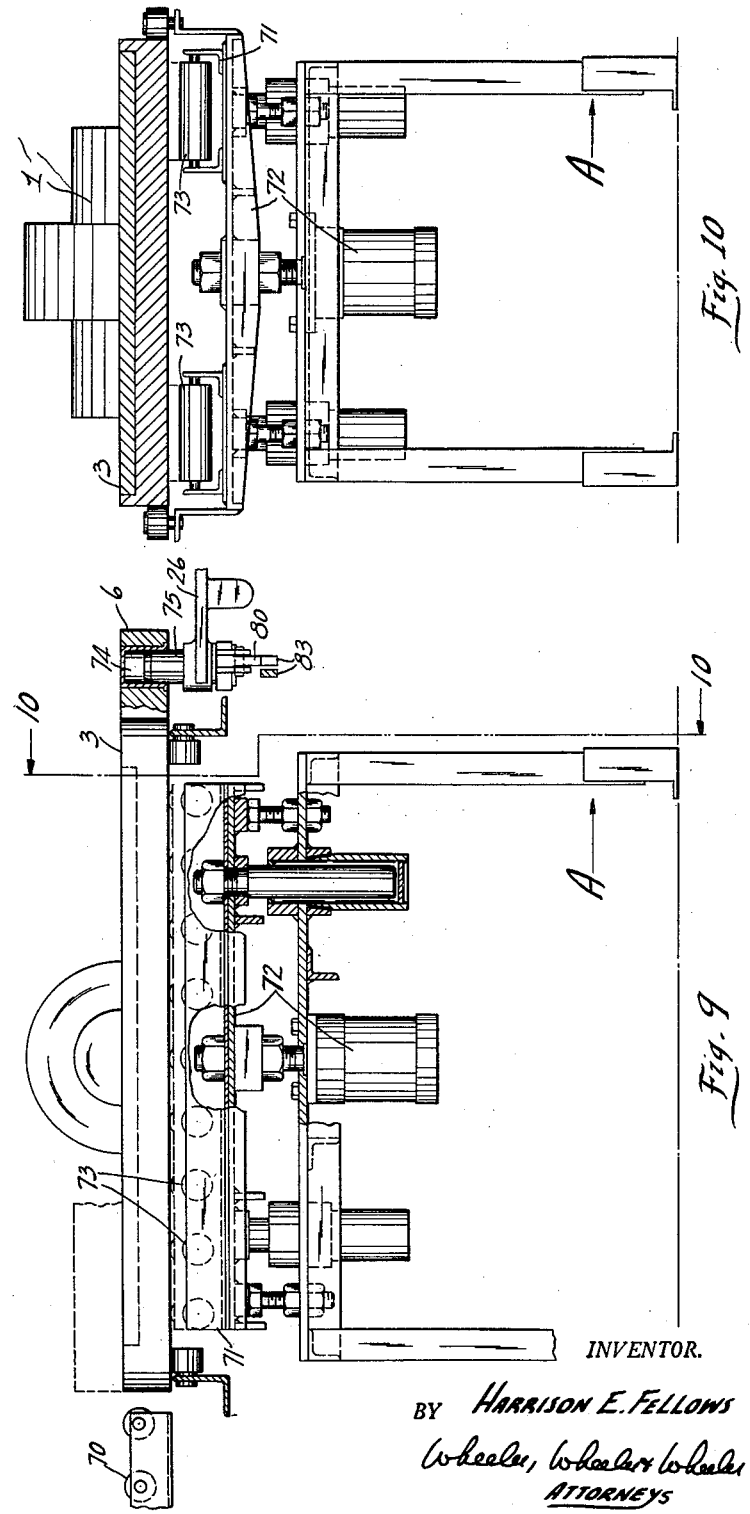

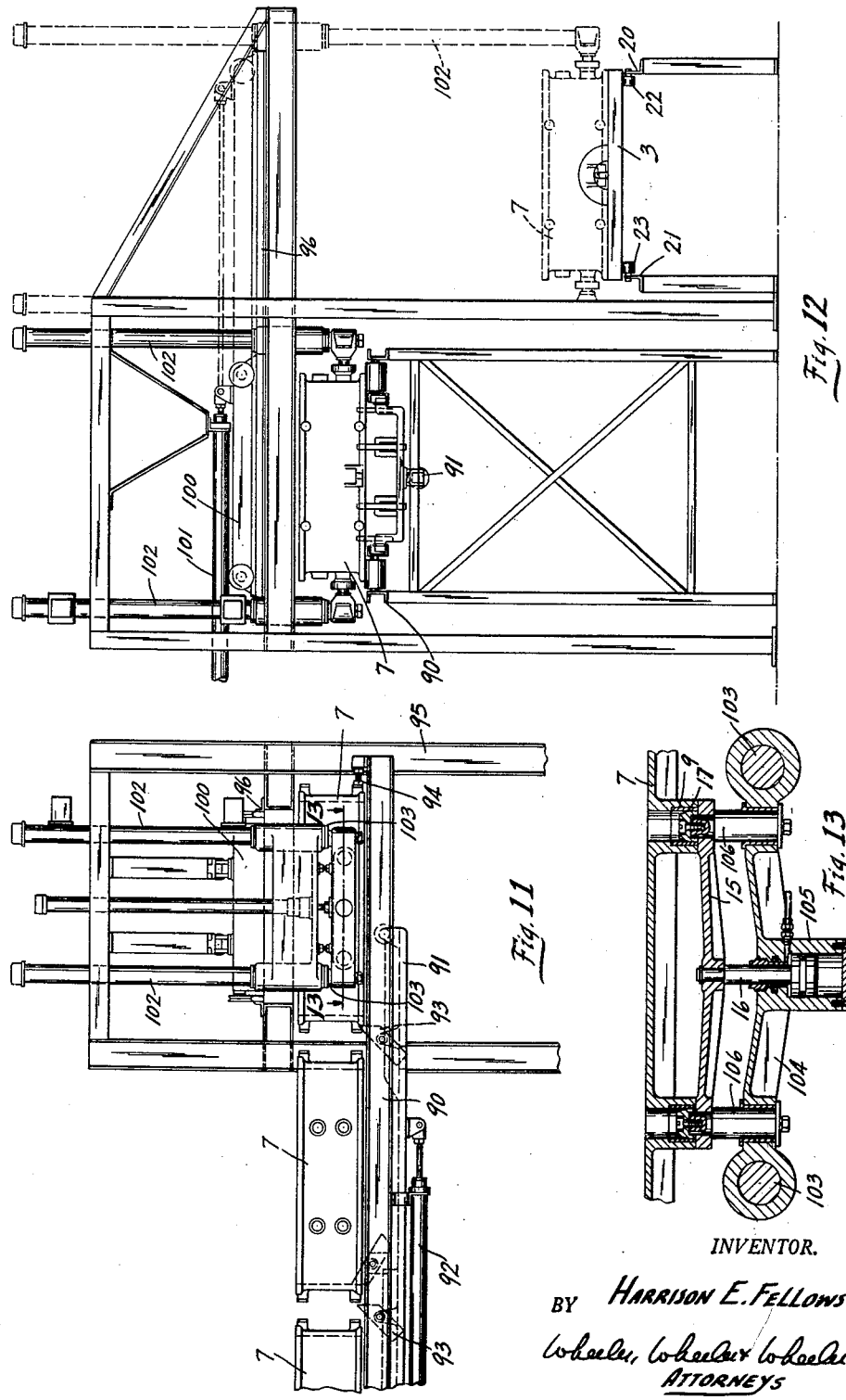

Dec. 18, 1962    H. E. FELLOWS    3,068,537
FOUNDRY SYSTEM AND APPARATUS
Filed Sept. 9, 1957    13 Sheets-Sheet 7

INVENTOR.
BY *Harrison E. Fellows*
*Wheeler, Wheeler & Wheeler*
ATTORNEYS

Dec. 18, 1962   H. E. FELLOWS   3,068,537
FOUNDRY SYSTEM AND APPARATUS
Filed Sept. 9, 1957   13 Sheets-Sheet 8
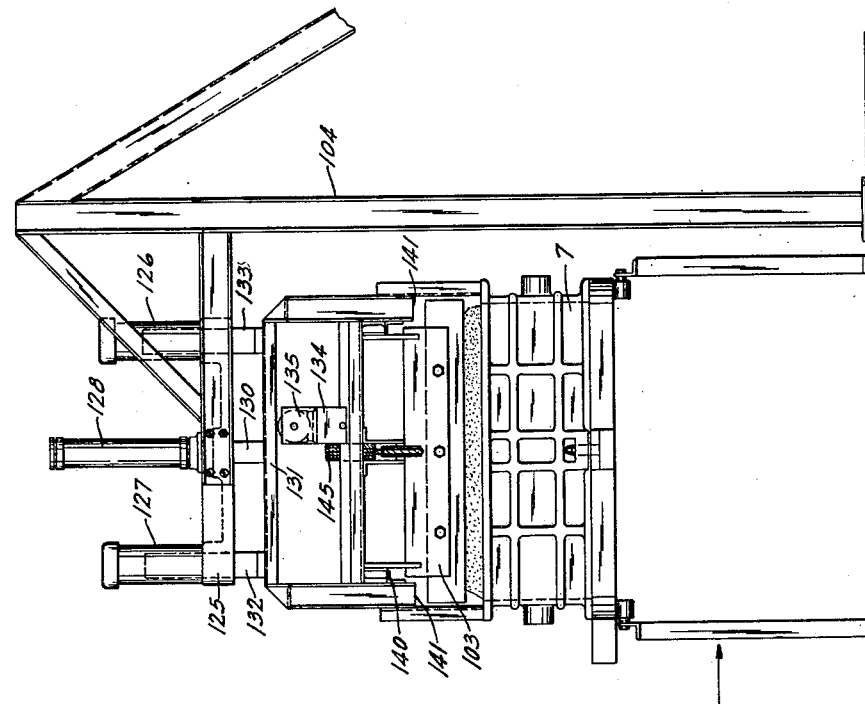
Fig. 19
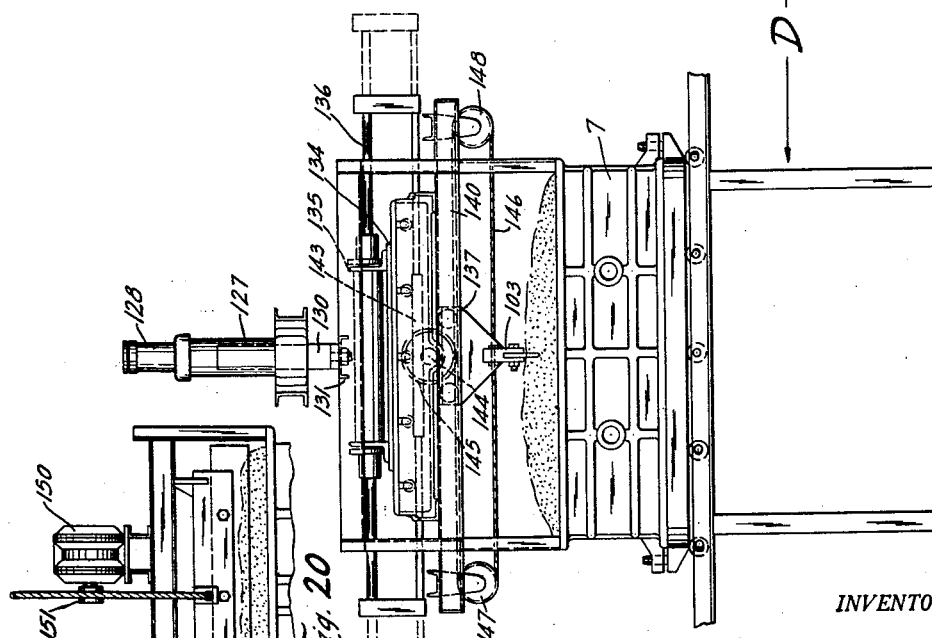
Fig. 18
Fig. 20
INVENTOR.
BY *Harrison E. Fellows*
*Wheeler, Wheeler & Wheeler*
ATTORNEYS Dec. 18, 1962   H. E. FELLOWS   3,068,537
FOUNDRY SYSTEM AND APPARATUS
Filed Sept. 9, 1957   13 Sheets-Sheet 9

INVENTOR.
BY *Harrison E. Fellows*
*Wheeler, Wheeler + Wheeler*
ATTORNEYS

Dec. 18, 1962 H. E. FELLOWS 3,068,537
FOUNDRY SYSTEM AND APPARATUS
Filed Sept. 9, 1957 13 Sheets-Sheet 10

INVENTOR.
BY *Harrison E. Fellows*
*Wheeler, Wheeler & Wheeler*
ATTORNEYS

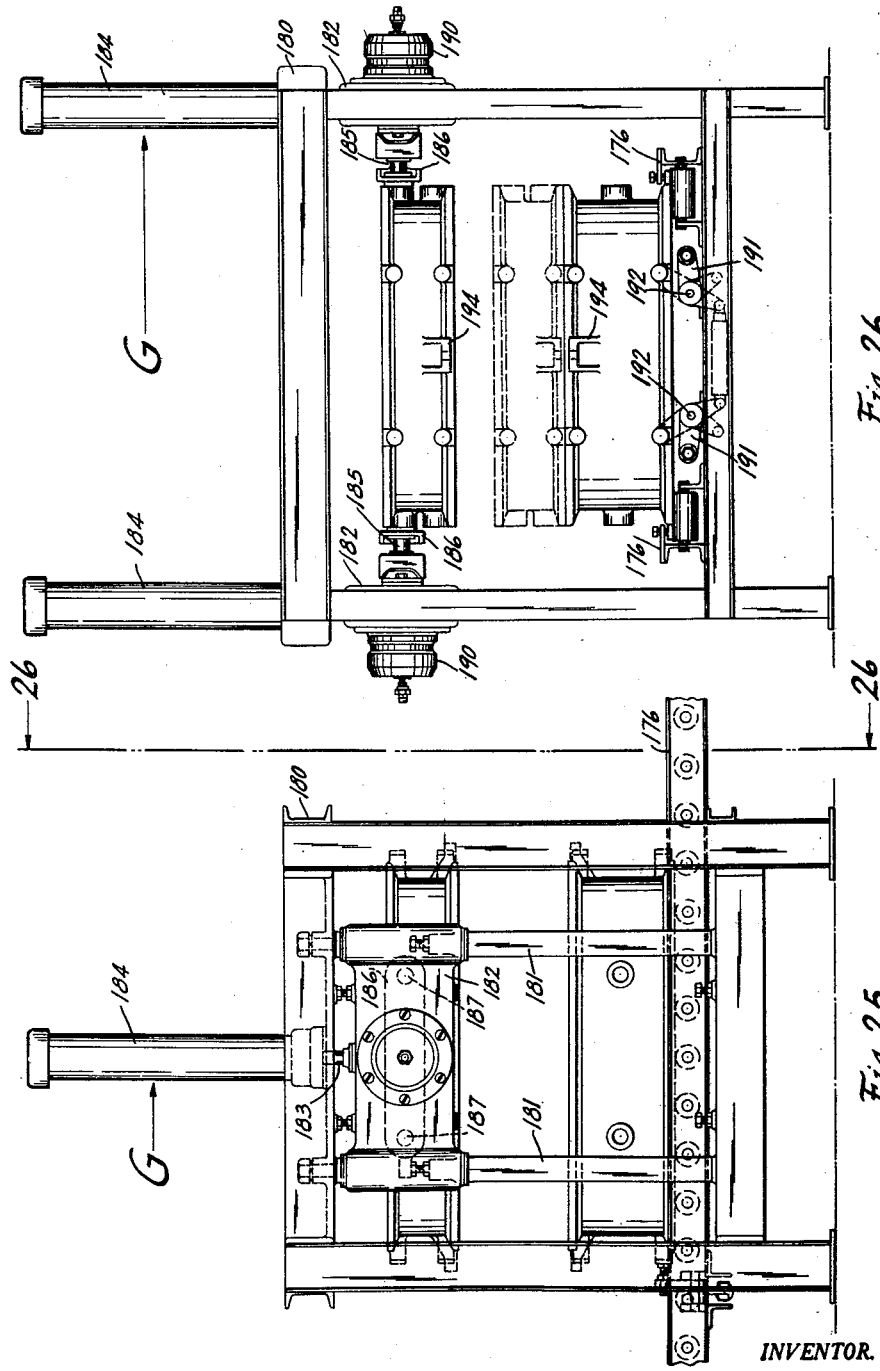

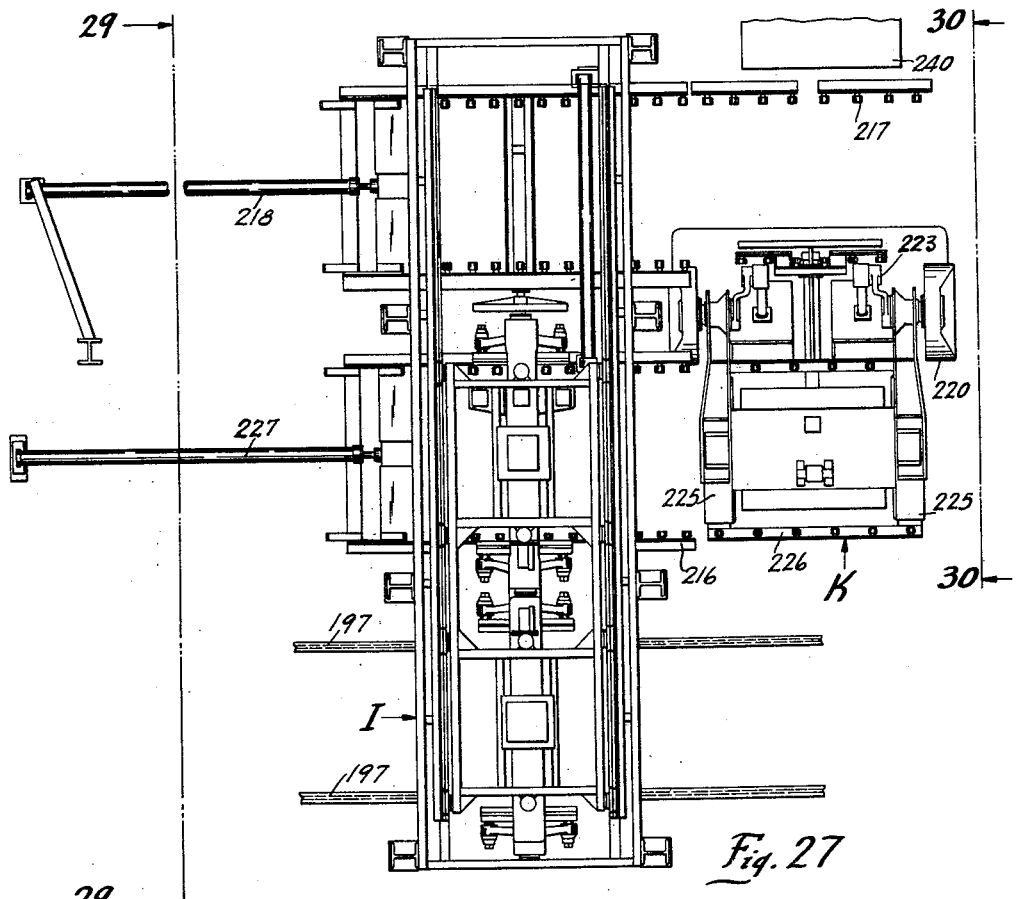
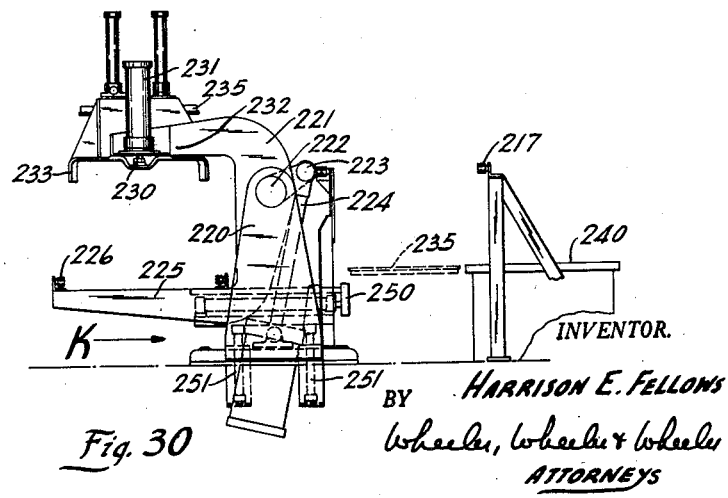

INVENTOR.
BY Harrison E. Fellows
Wheeler, Wheeler + Wheeler
ATTORNEYS

United States Patent Office 3,068,537
Patented Dec. 18, 1962

3,068,537
FOUNDRY SYSTEM AND APPARATUS
Harrison E. Fellows, Clearwater Lake, Wis.
Filed Sept. 9, 1957, Ser. No. 682,854
12 Claims. (Cl. 22—20)

This invention relates to a foundry system and apparatus. The present application is a companion to my application 656,642, filed May 2, 1957 and entitled Foundry Mold and Flask Handling Apparatus now Patent 2,985,926 issued May 30, 1961.

The device is of a type in which interlocking conveyor systems provide for the handling of flasks upon a circuitous path which includes all phases of foundry operation. One of the principal parts of the present invention is a conveyor organization to which an operator interchangeably supplies selected pattern plates for movement upon inner and outer annular sets of rolls subject to the precision control of a rotor having arms terminally coupled to the pattern plates and advanced step by step with precision movement.

At the first station, the pattern plate is loaded onto the track of the conveyor and coupled to the propelling arms. At the next station, a flask is automatically brought into position and lowered onto the pattern plate. At the next station, the flask is filled with sand and jolted to compact the sand. At this third station, segments of the inner and outer rolls upon which the flask engages are lowered to deposit the flask onto the table, means being provided to dowel the flask to the table during the jolting operation so that it will be restored accurately in registry with the propelling arms and reengaged therewith when raised to the level of such arms following the jolting operation. At the fourth station, a special strike-off mechanism levels the sand, working both ways from the center in order to assure against voids. At a fifth station, a squeeze machine operates on the sand to compress it within the flask. At a sixth station, the pattern is drawn and the mold is set out onto a conveyor which discharges it from this portion of the apparatus, the pattern thereupon being returned to its loading station, where it may either be replaced or passed through the apparatus to make another mold.

In several of the above stations, the flask and pattern plate are freed of connection with the propelling arms of the rotor and the arrangement must be such that the parts will be handled with the greatest accuracy so that following each such separation, the parts will be restored into their original doweled engagement. The flasks and pattern plate and the several mechanisms which engage either or both of these parts desirably have complementary dowel and socket means assuring the necessary accuracy.

Likewise, the movement of the rotor is desirably controlled within very narrow limits of tolerance. In practice, I provide the rotor with a ratchet wheel acted upon by a pawl roller at the end of a ram plunger. Adjustable stop means is rendered effective following every advance of the rotor and is moved out of the way to accommodate the next successive advance, all operations being automatic.

Drag and cope flasks may alternate in the output of the mold-making machine above described. Alternatively, the described mold-making apparatus may be duplicated, one producing drag molds and the other producing cope molds.

On the conveyor leading from the mold-making machine or machines, the molds are advanced to closing apparatus whereby each cope is engaged, lifted, rolled over, and held elevated until a drag arrives beneath it, whereupon the elevated cope is lowered and closed upon the drag, the completed mold thereupon leaving the closing apparatus. From this point, the closed mold is delivered onto a conveyor of the car type and passed to the foundry for pouring.

Upon return from the foundry, each car in turn is registered with a double-carriage conveyor which, in one operation, lifts a complete mold from a car and at the same time lifts the cope from the drag mold previously transferred. The drag mold with casting is transferred to a rollover machine. The complete mold and the elevated cope are moved laterally from the car and deposited. The cope is placed at a relatively high elevation while the complete mold is placed lower down. The drag from which the cope has been removed is rolled over and supported while the castings are withdrawn from it, whereupon it and the cope are both delivered over shakeout mechanism to a return conveyor which carries both flasks back to the starting point.

In the drawings:

FIG. 2 is a plan view on an enlarged scale of the indexing or annular conveyor shown in FIG. 1.

FIG. 3 is a view on a reduced scale taken in section on the line 3—3 of FIG. 2.

FIG. 4 is a fragmentary detail view taken in section through a roller of the inner ring of the indexing conveyor shown in FIG. 2.

FIG. 5 is a similar detail view taken in section through a roller of the outer ring of rollers in the indexing conveyor shown in FIG. 2.

FIG. 7 is a view taken in section on the line 7—7 of FIG. 6.

FIG. 9 is a view on an enlarged scale taken in section on the line 9—9 of FIG. 2.

FIG. 10 is a view taken in section on line 10—10 of FIG. 9.

FIG. 11 is a view on an enlarged scale taken from the viewpoint indicated at 11—11 in FIG. 1.

FIG. 12 is a view on an enlarged scale taken from the viewpoint indicated at 12—12 in FIG. 1.

FIG. 13 is a fragmentary detail view in horizontal section on the line 13—13 of FIG. 11.

FIG. 14 is a view similar to FIG. 13 showing a slightly modified arrangement for engaging the sides of a flask.

FIG. 15 is a view taken in section on the line 15—15 of FIG. 14.

FIG. 18 is a view in elevation from the viewpoint indicated by 18—18 in FIG. 2.

FIG. 19 is a view in end elevation of the apparatus shown in FIG. 18.

FIG. 20 is a fragmentary detail view showing a modified embodiment of the view illustrated in FIGS. 18 and 19.

FIG. 25 is a detail view on an enlarged scale taken from the viewpoint indicated at 25—25 in FIG. 1.

FIG. 26 is a view taken at right angles to FIG. 25 on the line indicated at 26—26 in FIG. 25.

FIG. 27 is an enlarged detail view in plan of a portion of the apparatus shown in FIG. 1 which is concerned with opening the molds for the removal of the casting.

FIG. 30 is a view taken from the standpoint of the line 30—30 of FIG. 27.

Figure 1:
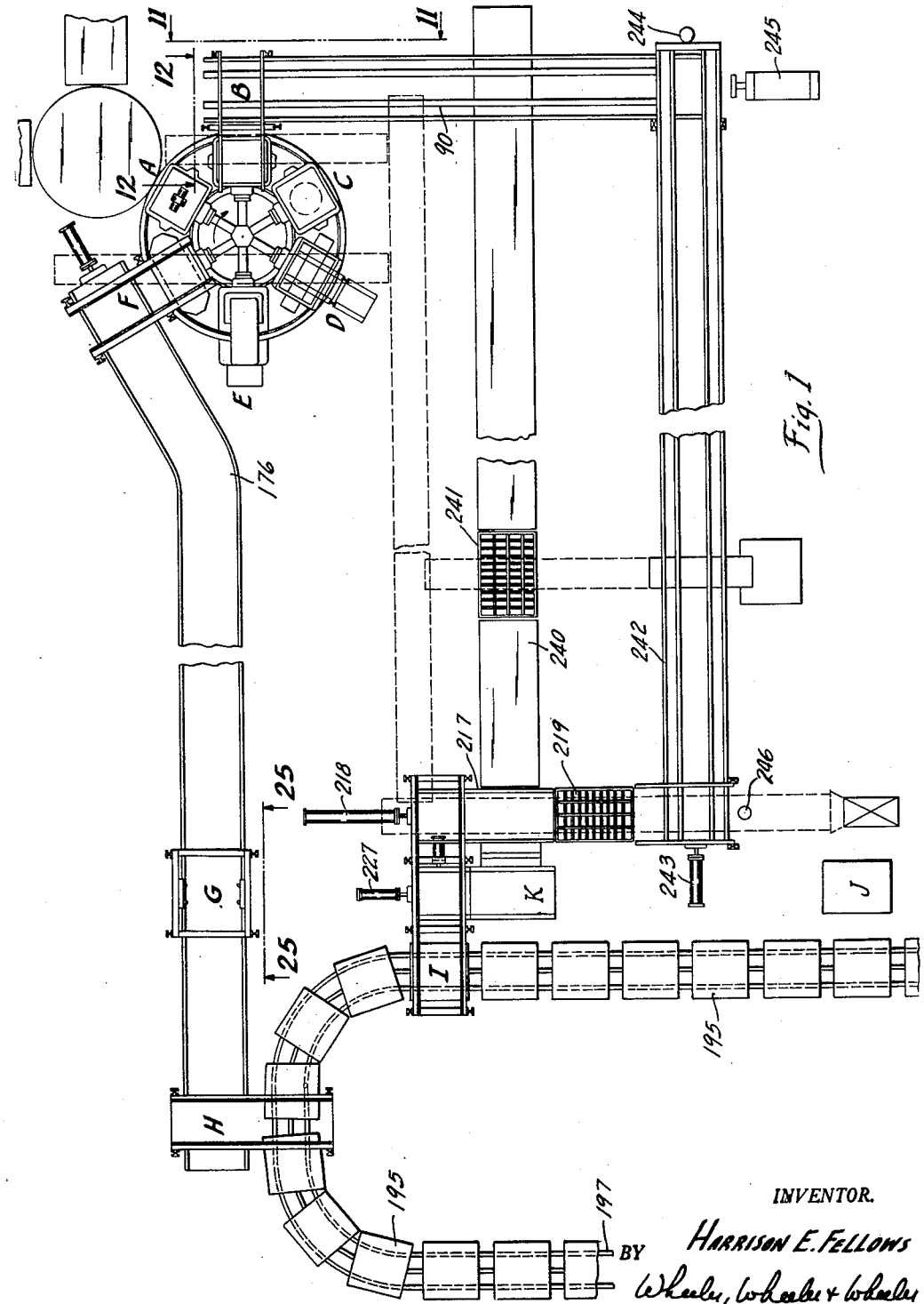
FIG. 1 is a diagrammatic plan view of the entire apparatus.

One or more patterns are mounted on a pattern plate 2 which, in turn, is put into a base frame 3 designed for cooperation with conveyor mechanism and drag and cope flasks as hereinafter described. Each such frame 3 desirably has terminal ears 4 provided with dowel pins 5 and each has laterally projecting arms 6 having downwardly opening sockets to receive the dowels of the propelling conveyor rotor hereinafter to be described.

Figure 17:
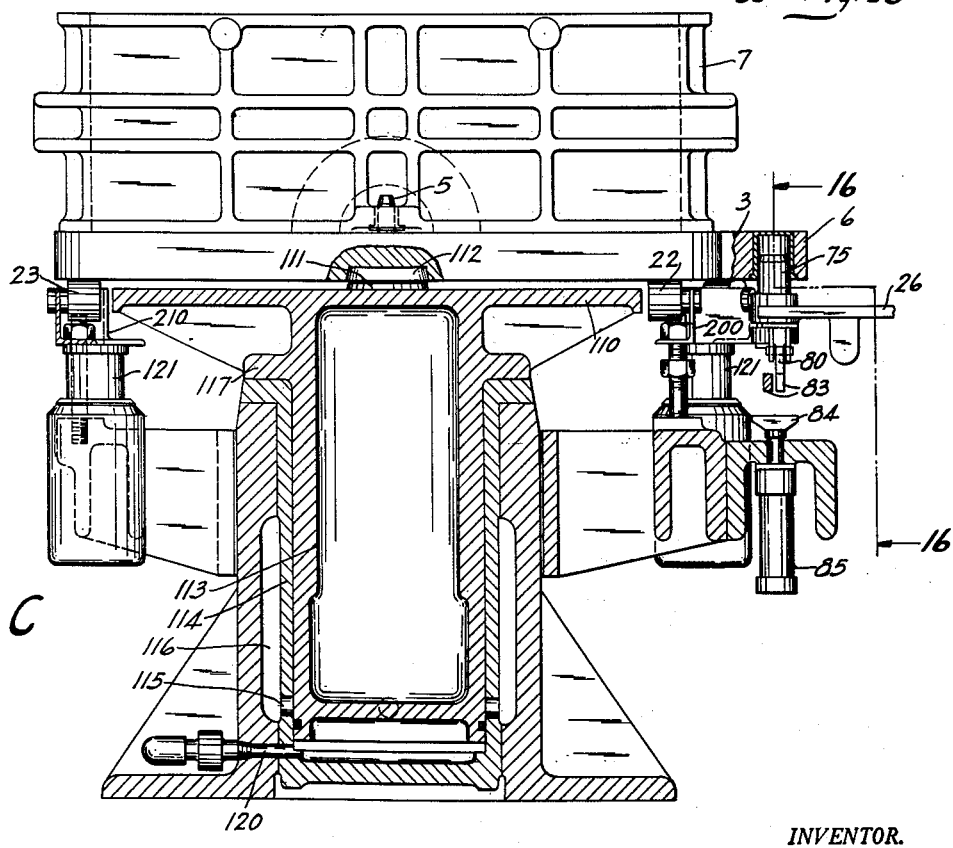
FIG. 17 is a view on an enlarged scale taken on line 17—17 of FIG. 2.

Flasks 7 such as that shown in FIGS. 2, 3 and 17 and more particularly described in the application above identified are interchangeably receivable on the respective base frames and have laterally projecting apertured ears 8 registrable with the ears 4 of the frame 3 and adapted to receive the dowels 5. Cope and drag flasks are made to be stacked, one upon the other, in clamped and/or doweled connection. They may be of identical heights or different heights. They have at their sides, at one or more levels at identical spacing from top and bottom, sockets or flange means which provide shouldered portions laterally spaced to be engaged in such fashion as to support the flask for rollover and transfer. The means described may comprise simply a pair of laterally spaced sockets 9 as in FIG. 13 or it may comprise a bar 10 having a single socket 11 and adapted to be engaged by a channel 12 having a stud 13 registering therewith (FIG. 14), the engagement of the channel with the bar providing the shouldered means effective at laterally spaced points to bring about rollover and the stud 13 and socket 11 providing lateral support for the flask during rollover movement.

In the case of the flask having laterally spaced sockets, the complementary member may comprise a crosshead 15 at the end of a ram 16 as shown in FIG. 13, the crosshead having a pair of tapered dowel studs 17 receivable into the respective sockets.

Patterns and flasks are assembled mechanically, filled and jolted, struck off, squeezed, and the patterns are drawn at successive stations on an annular conveyor shown in detail in FIGS. 2–10 and about which the base frames are indexed with precision by means hereinafter to be described.

The annular conveyor comprises inner and outer frame rings 20 and 21 of angle iron or the like which support inner and outer rollers 22, 23 in concentric annular series. As shown in FIG. 4, radial studs 24 mounted on the inner ring 20 have a slight downward inclination to the horizontal to support the frusto-conical rollers 22 with their top surfaces substantially horizontal. Similar rollers 23 shown in FIG. 5 are similarly mounted on radial studs 25 carried by the outer ring 21 at a slight upward inclination to the horizontal so that the top surfaces of these rollers are also substantially horizontal.

The reason for making the rollers of the inner and outer series frusto-conical, and at the same time adjusting their axes to leave their top surfaces horizontal, is to provide compensation for the fact that the path of travel of the frames supported on these rollers is circular. But for the difference in diameter as between the radially inward and radially outward ends of the respective rollers, the rollers would tend to feed the frames rectilinearly rather than arcuately. The frusto-conical pitch of the respective rollers is just sufficient to cause the frames to roll naturally upon the arc of the annular table.

Figure 6:
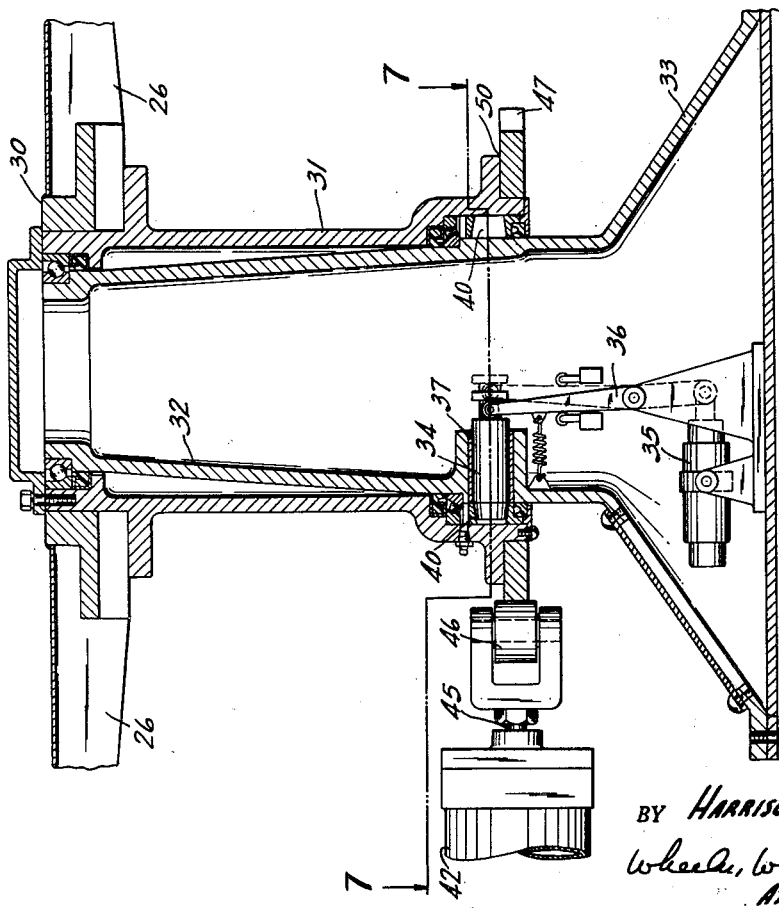
FIG. 6 is a view taken in section transversely of the pedestal of the indexing mechanism of the conveyor shown in FIG. 2.

The successive frames supported on the inner and outer annular series of rollers 22 and 23 which constitute the work supports of the annular indexing table are propelled and positioned by the rigid arms of a rotor 30 which, as shown, has the form of a spider with its hub 31 journaled on an upright axis at the center of the table as best shown in FIG. 6. A central post 32 with a broad base 33 provides bearings for the heavy hub 31 from which the arms 26 project.

Within the base there is at least one radial bushing 37 in which a dowel pin 34 having a tapered end is radially reciprocable by means of ram 35 and lever 36. For each arm, the hub is provided with a socket 40 which, in a given indexed position of that arm, will register with, and receive the dowel 34 to lock the hub rigidly to the base and thereby position the arm and the pattern base frame 3 connected with the arm in the manner hereinafter described.

For indexing the arms and hub from station to station, it is preferred to use a ram cylinder 42 pivoted at 43 to a fixed subframe 44 and having a ram piston 45 provided with a roller 46 and constituting a pawl engageable in successive ratchet teeth 47 of the specially designed ratchet wheel 50 mounted on the hub as best shown in FIGS. 2, 3, 6 and 7.

The locating dowel 34 being retracted, and the operating fluid being admitted to the ram cylinder 42, the piston pawl 45, 46 is extended to engage a tooth 47 of the ratchet wheel 50 and to advance the ratchet wheel by an angle representing the pitch between two successive teeth. In the course of such advance, the ram cylinder will oscillate upon its pivotal connection with its subframe against the bias of spring 51.

Figure 8:
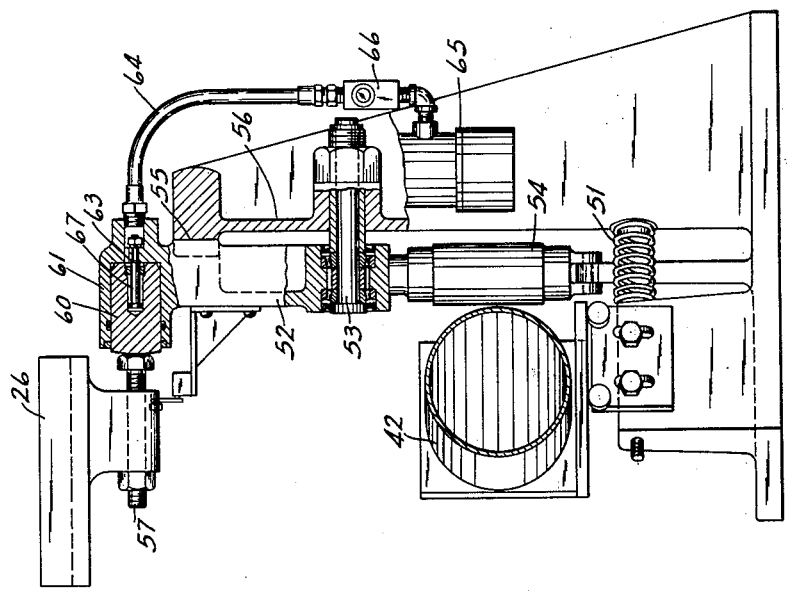
FIG. 8 is a detail view on an enlarged scale taken in section on the line 8—8 of FIG. 3.

In order that the rotative indexing advance of the turntable 30 need not be entirely dependent on the stroke of the ram piston 45, and in order to fix the extent of such advance accurately while, at the same time, cushioning the stop of the turntable at the conclusion of each such advance, I desirably provide an adjustable stop which moves to and from the path of the successive arms 26 of the turntable, being retracted to permit each successive arm to advance and then being moved back in the path of the next arm. In its preferred form, this stop comprises a bell crank lever 52 oscillated upon pintle 53 by a piston-actuated ram 54 as shown in FIGS. 3 and 8. The upper end of the lever 52 has a bearing against a rigidly fixed surface 55 provided by the fixed frame member 56 on which pintle 53 is mounted. Each of the arms 26 is provided with an adjustable bolt 57, the head of which engages the piston 60 reciprocable into cylinder 61 provided in the free end of the bell crank lever 52. The cylinder contains a hydraulic liquid which can escape through the orifice 63 into a pipe 64 leading to a pressure chamber 65 subject to the control of a regulating valve 66. Air is admitted under pressure to the chamber 65 to impose air pressure on the surface of the oil therein to move the piston 60 to the limit permitted by the stop bolt 67 at the same time that the bell crank lever 52 moves into the path of the arm 26. This air pressure is relieved before bolt 57 contacts the piston 60 so the movement of the oil from cylinder 61 to the reservoir 65 is controlled by the adjustable orifice in the control valve 66 to regulate the relief of the shock involved in arresting the movement of the turntable 30 while, at the same time, the fixed position to which the piston 60 is permitted to recede in displacing such oil positively determines the position at which the turntable will be brought to rest. This position is one in which one of the sockets 40 shown in FIG. 6 will register with the locking dowel 34 and the dowel is advanced into the socket as soon as the indexing movement of the turntable is arrested in the manner described.

To permit further indexing movement, the dowel 34 is retracted and concurrently the bell crank lever 52 is oscillated out of the path of the arm whose bolt 57 is engaged with piston 60. Only thereafter is pressure admitted to the ram 42 for the indexing advance of the turntable 30.

Following each such successive advance, and following the locking of the hub by means of the dowel, the piston 45 of the indexing ram 42 will be retracted. In the course of its retraction, the roller at the end of the piston will follow along the side of the next successive tooth of the ratchet wheel, this movement being accommodated by bodily pivotal movement of the ram assembly against the bias of spring 51 until the tooth is cleared. Thereupon the spring will cause the ram assembly to move pivotally back into position for engagement with the next tooth in the next subsequent operation of the ram.

The several frames 3 which support patterns 1 and/or flasks 7 on the rollers 22 and 23 of the annular table are in rigid but detachable connection with the ends of respective arms. Patterns and frames, assuming these have substantial weight, are desirably moved to and from the conveyor at pattern change station A by any appropriate conveyor means such as the conveyor 70 shown in FIGS. 2 and 9. Between the inner and outer rollers 22 and 23 of the annular conveyor at the pattern change station A is a conveyor section 71 mounted on a downwardly retractable ram-operated elevator 72 shown in FIGS. 9 and 10. The frame-supporting rolls 73 of this conveyor section accommodate pattern frame movement radially to and from the turntable.

When the pattern frame 3 arrives at the proper position on the indexing table, the elevator will be lowered from the dotted line position to the full line position shown in FIG. 9 to deposit the frame on the rollers of the indexing table in a position in which the ears 6 of the frame will overlie the end of one of the arms 26. The ears provide circumferentially spaced sockets 74 which receive the normally upwardly projecting dowels 75 provided at the end of each arm 26 of the indexing rotor, as best shown in FIGS. 2, 3, 16 and 17. Each of these dowels 75 is retractable at another station. For this purpose, each has a shifting spool 76 at its lower end by which the dowel may be advanced and retracted. Shifting levers 80 having forks 81 engaged in the respective spools 76 are pivoted to the underside of the arm 26 (FIG. 16) and are subject to the action of springs 82 which normally tend to bias the dowels 75 toward the advanced elevated positions of engagement in the sockets 74 of the frame 3.

Figure 16:
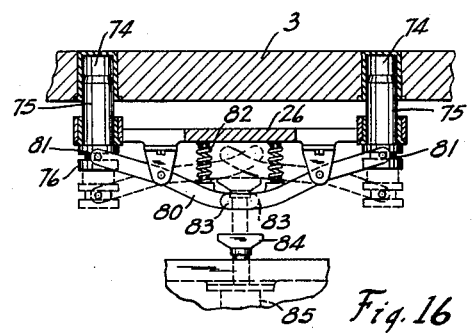
FIG. 16 is a view taken in section on the line 16—16 of FIG. 17.

The ends 83 of the dowel shifting levers 80 extend past each other in lateral proximity, whereby they can be engaged concurrently by the piston head 84 of a stationary retracting ram 85 which is located at the jolt station C. The piston 84 of ram 85 is normally retracted, but before jolting starts (as hereinafter described), the ram piston head 84 is advanced to engage the lapping ends of the dowel retracting levers 80 to oscillate these levers from the full line position of FIG. 16 to the dotted line position indicated therein, thereby withdrawing the dowels from the pattern frame. As soon as the jolting operation is completed, the ram piston is retracted, thereby allowing the bias of springs 82 to raise the dowels 75 into engagement with the pattern frame 3 as shown in FIG. 16. The pattern frame is again rigidly locked to the arm which propels and positions it in its movement circuitously about the indexing table. Aside from retraction as above described, the dowels lock the pattern frame to the turntable arms throughout the indexed step-by-step progression of the frame about the annular conveyor.

While I have described the capacity of the dowels 75 for retraction, and the means for effecting such retraction at station C, it will be understood that in mounting and dismounting frame 3 at station A the dowels are fixed and the frame is engaged and disengaged with them when it is lowered or raised on the annular conveyor by means of elevator 72 as above described. During the next indexing operation of the ram pawl, the pattern frame and the pattern and plate mounted therein will be advanced from the pattern change station A to the flask placement station B to receive a flask 7.

Flasks returning from previous use are on the conveyor track 90 diagrammatically shown in FIG. 1 and more particularly shown in FIGS. 11 and 12. A bar 91 reciprocable along this track, as by means of the ram 92, is provided at intervals with pawls 93 which are gravity biased to a position of normal upward projection where they will engage successive flasks 7 to advance these along the track toward the stop provided at 94 on the transfer frame 95.

The transfer frame 95 includes an overhead track 96 for a carriage 100 which is movable transversely of the conveyor track 90 upon which the flasks 7 are returned. The overhead carriage 100 is reciprocated by means of a ram 101 as shown in FIG. 12. It carries pairs of lifting rams 102 spaced at opposite sides of the flask. The pistons 103 of both rams at the same side of the flask are connected by clamping bars 104. One of these bars is shown in FIG. 13. It is provided with a clamp ram 105 having its piston 16 above described movable horizontally inwardly toward the flask.

The dowels 17 connected by crosshead 15 at the end of the piston 16 have bearing guides 106 mounted in the clamp bar 104. These dowels are so spaced as to be receivable in the sockets 9 of the flask. The flask engaged by the dowels provides the only connection between the clamping bars 104 mounted on the pairs of rams at opposite sides of the flask.

With a flask 7 in position as shown in FIG. 11, the clamping ram piston is advanced to engage the clamping dowels with opposite sides of the flask in the manner shown in FIG. 12. The elevating rams 102 of the carriage are now supplied with fluid to elevate the flask from the rollers of the return conveyor 90, and the carriage advancing ram 101 then moves the carriage 100 from the full line position to the dotted line position of FIG. 12. In this position, the flask is located with precision directly over the pattern plate 2 and pattern 1 which it is to enclose at station B. The elevating pistons are now actuated to lower the flask to the position in which the flask is shown in dotted lines in FIG. 12 in which it is directly on the base frame 3 to enclose the pattern 1 mounted thereon.

Following this operation, the next successive advance of the ratchet ram pawl indexes the assembled flask and pattern plate on the base frame to the fill and jolt station C (FIG. 17). Here molding sand is delivered into the flask by any approved means such as a hopper, leaving a substantial surplus of sand heaped above the top of the flask.

Immediately beneath the location of the pattern frame at the fill and jolt station C is a jolt table 110 provided with central bosses 111 for which the pattern frame provides locating sockets 112. The jolt table 110 is mounted on top of a heavy plunger 113 vertically reciprocable with short stroke in a cylinder 114 having ports 115 opening laterally into an annular exhaust chamber 116. At the level at which the annular flange 117 engages the top of the cylinder, the plunger extends only slightly below these ports.

Communicating with the cylinder 114 beneath the plunger 113 is an air supply connection 120. When air is admitted to the cylinder 114 through this connection, the plunger 113 is forced upwardly until it clears the escape ports 115. Compressed air escaping through these ports abruptly lowers the pressure beneath the plunger and the plunger reciprocates sharply downwardly, thereby closing the ports 115 and causing the cycle of vertical reciprocation to be repeated rapidly to create the desired jolting effect.

In order to relieve the index table rollers and the index arms from the shock of the jolting operation, both the rollers 22, 23 and the dowels 75 at the ends of the arms 26 are desirably retracted preliminary to the jolting. For this purpose, segments 200, 210 of the rings 20, 21 which carry the index table rollers 22, 23 are mounted on rams 121 (FIG. 17) for vertical movement between retracted and operative positions, and the retracting ram 85 is used to act on the shifting levers 80 as already described to withdraw the dowels 75 from the sockets 74 in the ears of the frames 3 at this station until the jolting operation is complete.

The frame 3 which supports the pattern plate 2 and flask 7 is so close to the top of the jolt table 110 even in the retracted position of the latter that only a slight degree of movement of the ring segments 200 and 210 is required in order to deposit the pattern plate frame on the jolt table free of the index conveyor table arms 26. Upon completion of the jolt operation, the ring segments 200, 210 are raised and the head 84 of the dowel retracting ram 85 is withdrawn to permit the dowels 75 at the ends of the propelling arm 26 to re-engage the frame 3 for advance to the strike off station D.

Upon the next operation of the pawl plunger indexing of ram 42, the flask 7, with its content of sand compacted by the jolting operation, is advanced to the strike off station D. An important feature of the strike off mechanism is an arrangement whereby a strike off blade 103 is normally centered over the flask as shown in FIG. 18 and moves in a cycle whereby the blade is advanced first across the flask to one end thereof and then across the flask to the opposite end thereof. By this operation involving moving the blade from the center toward both ends separately, I am assured against leaving any voids in the corners such as might occur if the movement of the strike-off blade were continuous from either end toward the other.

A supporting frame 104 at the strike off station D has an arm 125 overhanging the position of the sand-filled flask 7 at this station. Mounted on this arm are a pair of tubular bearing guides 126, 127 and a central ram cylinder 128. Connected to the ram piston 130 is a crosshead 131 attached to bars 132, 133 reciprocable in the bearing guides 127, 126. Supported by the bars is a subframe 134 which includes a double-acting ram cylinder 135, a plunger 136 projecting at both ends of the ram cylinder, and a carriage 137 provided with a track 140 on the subframe along which the carriage is reciprocable over the flask. Mounted on the carriage is the strike off blade.

When the subframe is lowered by extending piston 130 of ram 128 as shown in FIG. 18, plates 141 on the subframe will engage the sides of the flask 7 to locate the level to which the strike off blade 103 will penetrate the sand heaped up in the flask and to confine the sand from lateral spilling during blade operation (see FIG. 19).

Connected with the double-ended piston 136 of the double-acting ram 135 is a rack 143 meshing with a pinion 144 to which drum 145 is attached. Wound about the drum are one or more coils of a cable 146 which is trained over pulleys 147 and 148 at opposite ends of the subframe. This cable is connected with the carriage-supported strike off blade 103. The arrangement described is merely a convenient way of multiplying the motion of the piston of the double-acting ram to provide adequate length of travel for the strike off blade.

When pressure is admitted at one end of the double-acting ram, the strike off blade is caused to move from the central position at which it is illustrated in FIG. 18 across the flask 7 to one end thereof. When pressure is admitted to the opposite end of the double-acting ram cylinder, the strike off blade is caused to move back across the flask to the opposite end thereof. Thus, the strike off blade, which enters the sand at the center of the flask, is caused to move from the center across the flask in separate operations to each of its ends, assuring a sufficient quantity of sand ahead of the strike off blade from the sand piled at the center to fill any void which may exist in the corners of the flask. The sand remains at a predetermined level above the top of the flask after the strike off blade has been returned to its initial, normally centered position following relief of pressure from the double-acting cylinder.

As will be apparent, the manner in which the strike off blade is operated from its normally centered position alternately toward the opposite end of the flask 7 is not a critical part of the invention. Instead of using the double-acting ram 135, 136 as above described, I may use a motor 150 as shown in FIG. 20, the motor being reversible and having a cable connection from its pulley 151 to the strike off blade 103. Any source of power may be used. Since hydraulic power is used elsewhere in the apparatus, the motor 150 as illustrated is a hydromotor.

Figure 21:
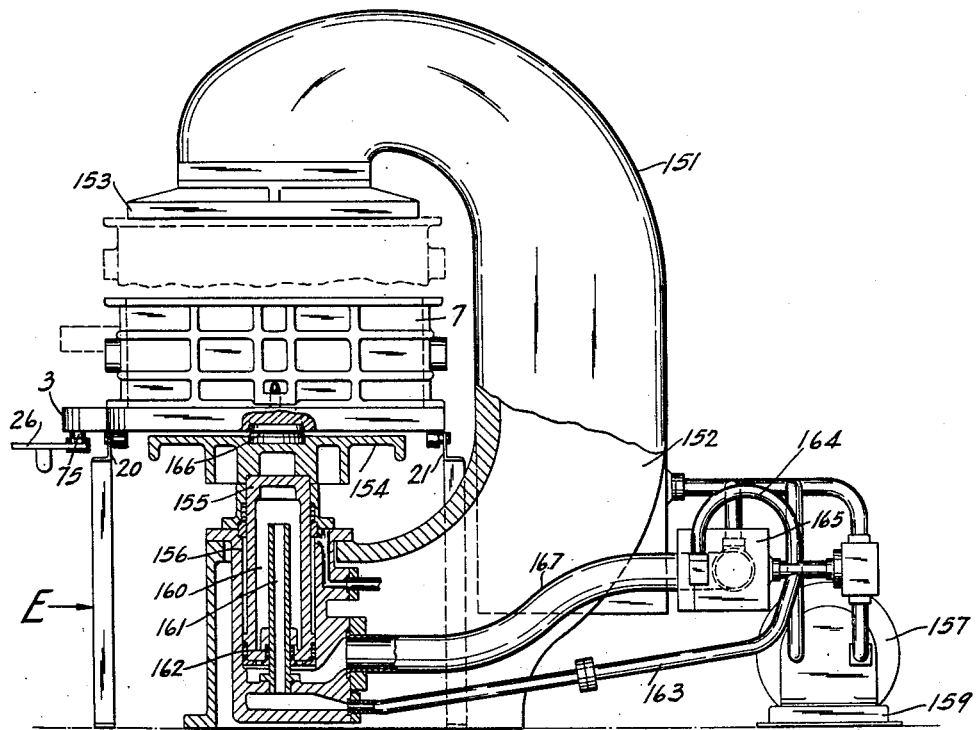
FIG. 21 is a view taken in section on line 21—21 of FIG. 2.
Figure 24:
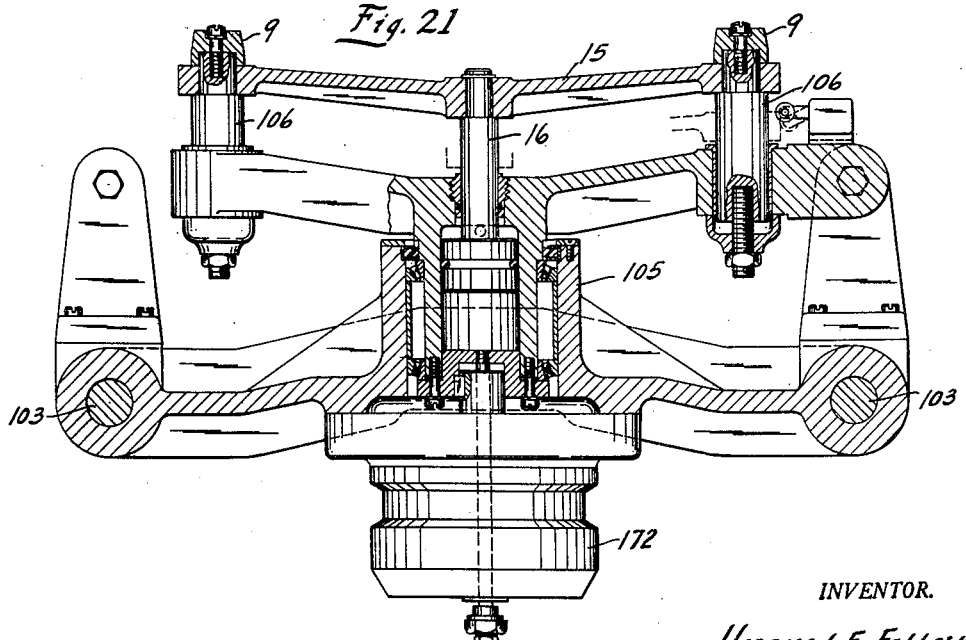
FIG. 24 is a view on an enlarged scale taken in section on line 24—24 of FIG. 23.

Following the strike off operation, the next indexing operation advances the flask to station E where a squeeze press 151 compresses the sand in the flask and compacts it sufficiently so that it will be form-sustaining when the pattern is withdrawn. Such a press is shown in FIG. 21. It comprises a C-frame 152 terminating in a top platen 153 of such dimensions as to be equal at least to the area of the flask in plan. The lower table 154 is mounted on a plunger 155 in a cylinder 156. The interior of the ram plunger is hollow to serve as a rapid traverse ram cylinder 160 into which extends tubular piston 161 through packing at 162. A connection to the tubular plunger 161 is made from the high pressure pump 157 through pipe 163. A bypass connection is provided through pipe 164 around the surge valve 165. Until heavy resistance is offered to the upward movement of the ram piston 155, oil is pumped by the pump 157 from the reservoir 159 through pipe 163 to effect rapid traverse of the ram piston. When the sand contacts the stationary platen 153 with substantial pressure, the back pressure opens the surge valve 165 whereupon the ram pump 157 delivers oil from the reservoir to pipes 163 and 167 to effect a slower but more powerful movement of the ram to compress the sand in the mold. It will be observed that the assembly of the base member pattern and mold is lifted from the rollers 22, 23 of the indexing table conveyor. Bosses 166 on the movable table 154 of the squeeze press are used to keep the plate 3 centered on the press table during this operation. When the flask is lowered to restore the assembly to the rollers 22, 23 of the indexing conveyor, the plate is re-engaged with the dowels 75 at the end of the appropriate arm 26.

Figure 22:
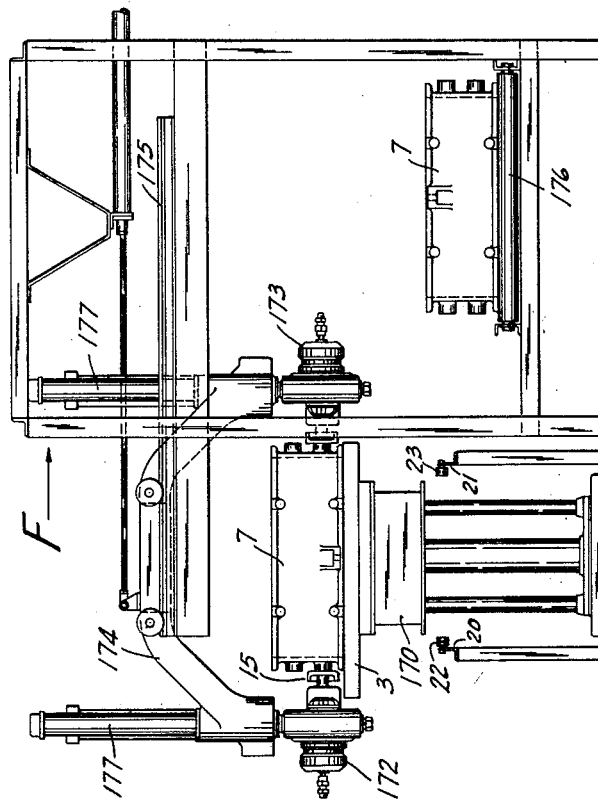
FIG. 22 is a view taken in section on line 22—22 of FIG. 2.
Figure 23:
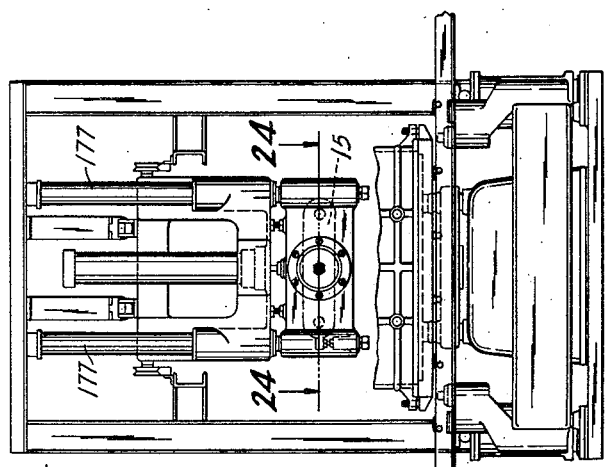
FIG. 23 is a view in end elevation of the apparatus shown in FIG. 22.

At station F, the mechanism shown in FIGS. 22 and 23 lifts the pattern frame from the indexing table conveyor to a level such that the flask supported thereon may be engaged by clamping to a rollover mechanism mounted on an overhead carriage. When the flask is so engaged, the elevating mechanism is lowered, taking the pattern frame and pattern with it and re-depositing this assembly on the indexing table conveyor. Thereupon, the flask is rolled over and transferred by carriage movement to an outfeed conveyor, while the pattern and pattern frame are returned to station A for re-use or withdrawal from the apparatus.

Referring now to FIGS. 22 and 23, I show an elevator 170 disposed between the inner and outer series of rolls 22, 23. In the position of the parts shown in FIG. 22, this elevator has raised the pattern frame 3 and the flask 7 to a level such that the flask 7 has its lateral sockets 9 registered with dowels of clamping bars 15 which correspond exactly to those above described in connection with the flask transfer conveyor mechanism shown and described in connection with FIGS. 11 to 13. However, in this device, the jaws are mounted for bodily rotation as well as for inward and outward movement, being connected for that purpose with hydromotors 172, 173. Details of the structure of this mounting of the clamping arms are shown in FIG. 4 of the companion application above identified.

The entire assembly is mounted on a carriage 174 movable along a track 175 whereby the flask, free of the pattern and pattern frame drawn downwardly as the elevator 170 retracts, is then moved into registry with the outfeed conveyor 176 upon which it is deposited by the lowering operation of rams 177. These rams correspond to the rams 102 described in connection with FIGS. 11 and 12. Vibrating mechanism can be included in the elevator hoist 170 if desired, the vibration assisting in drawing the pattern from the sand mold within the flask 7.

The rollover may be effected either in the position of the carriage shown in FIG. 22 or following movement of the carriage to a position over the outfeed conveyor 176 or even while the carriage is in transit between these two positions.

The finished mold is advanced upon the conveyor to the closing station G. Ordinarily the cope and drag will be produced alternately on the indexing table in the procedure above described so that the drag which is to be assembled with a given cope will immediately follow the cope on conveyor 176.

Alternatively, two separate turn tables and associated mechanisms as above described can be used to make cope and drag molds for the delivery of such molds alternately to conveyor 176. Since this involves mere duplication of the structure already described, it is not separately illustrated.

Straddling the conveyor 176 at station G is a frame 180 providing at each side of the conveyor guide bars 181 upon which crossheads 182 are vertically reciprocable. Each such crosshead is connected with the piston 183 of an elevating ram whose cylinder 184 is mounted on the frame 180. Each crosshead carries a laterally extensible ram 185 provided with a clamping bar 186 having dowels 187 for engaging a flask at spaced points. Each such laterally extensible ram is further provided with a rotor at 190 for rotating its clamping bar and the engaged flask to invert the flask, the organization being similar to that shown in FIGS. 22 and 23 as above described and used at station F for inverting the mold and depositing it upon conveyor 176.

The flasks arriving at station G on conveyor 176 may be stopped by hand but desirably mechanical stops are provided. These may constitute bell cranks 191 pivoted at 192 on the frame of conveyor 176 and movable between the retracted positions shown in full lines in FIG. 26 and the advanced positions shown in dotted lines in that view.

With the stops adjusted to their effective positions, a cope flask advancing on conveyor 176 will be accurately located with respect to the dowels of the clamping bars 186. The crossheads 182 will be lowered until the clamping bars are at the proper level to engage the flask. The cope flask will, at this time, have its mold opening upwardly. When the clamping bars register with the cope flask, the laterally acting rams will be actuated to engage the bars with the flask. The cope flask will then be elevated by ram 184 and rolled over by the rotors 190 and held in the elevated position until the drag mold flask advances on conveyor 176 to engage the stops 191 in a position immediately beneath the inverted cope mold flask.

Thereupon the rams 184 will be actuated to lower the inverted cope mold flask onto the drag mold flask as shown in dotted lines in FIG. 26 to close the mold. A pin or bolt is desirably used to connect the cope and drag mold flasks through the aperture ears 194 with which the respective flasks are provided. Stops 191 are now pivoted to their retracted positions shown in full lines in FIG. 26 to permit the assembled mold to continue to advance on conveyor 176.

At station H a transfer conveyor of any appropriate kind transfers molds from conveyor 176 to the pouring conveyor 195. This desirably comprises wheeled flat cars 196 connected together in endless series operating on an endless track 197. I have used such cars on 5 foot centers in one typical installation.

The present application is not concerned with pouring. Therefore, the pouring position is not illustrated. According to the apparatus provided at transfer station H and the pouring station J, the cars 196 comprising conveyor 195 may be in continuous or intermittent motion.

In any event, the filled molds on their respective cars are ultimately returned to station I. The mechanism at this station is separately illustrated in FIGS. 28 and 29.

A double carriage 201 reciprocable on track 202 reciprocates transversely to the track 197 upon which the cars 196 operate. Mounted on the carriage to move therewith along the track 202 are two separate hoists.

Figure 29:
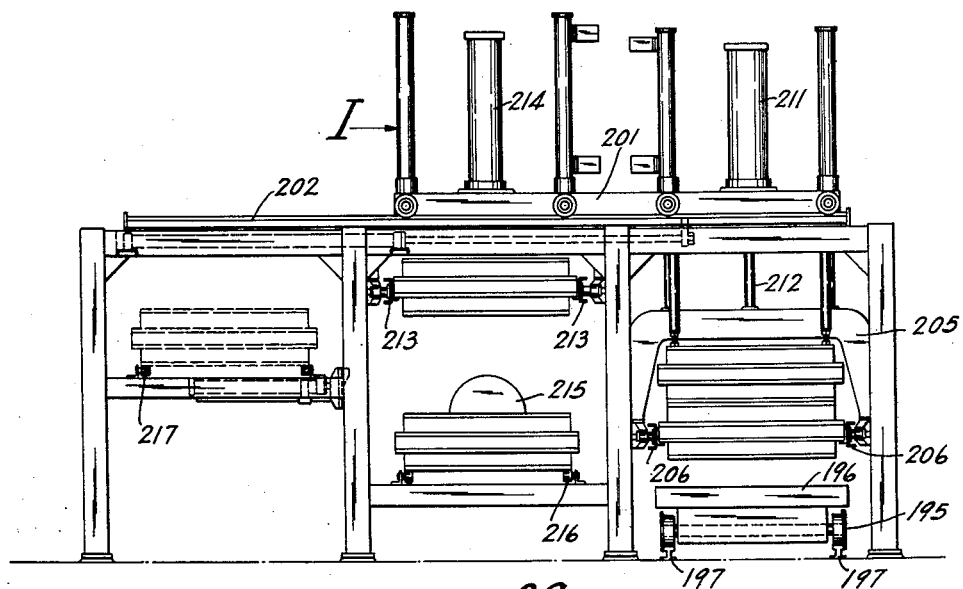
FIG. 29 is a view taken from the standpoint of line 29—29 of FIG. 27.

At the righthand end of the carriage 201 as viewed in FIG. 29 is a hoist so located that the yoke 205 is directly over a filled mold which has just arrived on one of the cars 196 of conveyor 195. This yoke 205 is supplied with laterally acting rams and clamping bars 206 comparable to those shown in flask placement conveyor shown in FIGS. 11 to 13. They are, however, more strongly constructed, being called upon to lift the complete mold and its contents. The ram cylinder 211 is provided with fluid connections to raise and lower the ram piston 212 connected to yoke 205. In the raising operation, the mold is lifted unitarily from the conveyor car 196 as shown in FIG. 29.

A second hoist is mounted on carriage 201 at the lefthand end of the carriage as viewed in FIG. 29. Its clamping bars 213 are raised and lowered by means of a ram which includes cylinder 214. Bars 213 are laterally operable in the same manner as above described and are disposed at a level to engage the cope flask only. When the bars are engaged with the cope flask of a previously set out mold, the cope flask will be elevated to withdraw it from the casting 215 as shown in FIG. 29. With the newly arrived mold elevated by the righthand ram and the cope flask of a previously set out mold elevated by the lefthand ram, the carriage will move to the left as viewed in FIG. 29. Meantime the drag flask of the previous set out mold will have been pushed out of the way on the set out conveyor 216 by means of a ram 227, which advances the drag flask to a rollover machine as hereinafter described. Accordingly, the complete mold picked up from the car and moved to the left by carriage 201 can now be deposited on the set out conveyor 216 while the elevated cope flask will be deposited on its set out conveyor 217 to be advanced by ram 218 to shakeout 219 (FIG. 1).

As soon as the full mold and the cope flask transferred by carriage 201 have been deposited on the respective set out conveyors 216 and 217, the carriage returns to the position which is illustrated in FIG. 29 where the cope flask of the recently set out mold is lifted from its drag flask by the left hoist 213, 214 and a complete, newly arrived mold is lifted from the conveyor car by the right hoist 206—212 to repeat the cycle.

Figure 28:
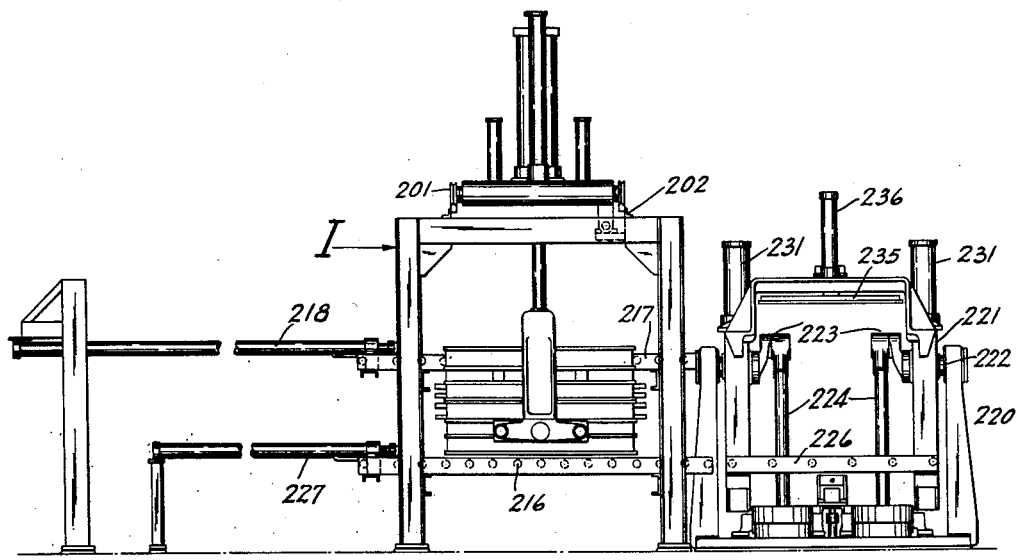
FIG. 28 is a view taken from the standpoint of line 28—28 of FIG. 27.

The rollover machine to which the drag flask and casting are advanced by ram 227 is disposed at station K and illustrated in FIGS. 27, 28 and 30. The frame 220 pivotally supports C-clamps 221 whose trunnions 222 are provided with cranks 223 operable by means of ram pistons 224 to invert the C-clamps and contents. The lower jaws 225 of the C-clamps support a section 226 of the set out conveyor 216 onto which the drag flask and casting are pushed by ram 227. For holding the drag flask during inversion, it is clamped to the conveyor section 226 by flanged clamps 233 mounted on pistons 230 of ram cylinders 231 which are mounted on the upper jaws 232 of the C-clamps 221. Meantime a plate 235 disposed centrally between the yokes 233 is advanced downwardly by the pistons of rams 236 to engage the casting.

The C-clamps 221 are now rolled over upon their high trunnions to invert the drag flask and casting over the elevated set out conveyor 217 upon which the cope flask has been deposited. The drag flask will be deposited on conveyor 217 directly in front of a cope flask from the same mold so that when ram 218 acts to advance the newly arrived cope flask, an inverted drag flask will be in position to be pushed ahead of it along conveyor 217. With the drag flask deposited upside down on the spaced rollers of conveyor 217 in consequence of the rollover of C-clamp 221, the rams 236 of the C-clamp will be used to lower the plate 235 between the conveyor rolls as shown in FIG. 30 to register the casting with the casting discharge conveyor 240 along which the casting may be advanced in any desired manner to cross shakeout 241 on which it is freed of core sand.

In a preferred arrangement, the laterally operable ram 250 is vertically reciprocable by rams 251 (FIG. 30). When casting 215 is lowered on plate 235, ram 250 is elevated to the level of the casting as shown in dotted lines and is energized to push the casting from the plate onto conveyor 240.

Meantime, the flasks advancing over shake-out 219 by successive operations of ram 218 will encounter stops 246 which will arrest them in registry with the return conveyor 242 onto which they are thrust by the action of ram 243.

Successive flasks are stopped by the stop member 244 in a position from which they are actuated by ram 245 onto the conveyor 90, which restores them for reuse at station B, all as shown diagrammatically in FIG. 1.

Since both the flasks and the base frames are used to support the mold and since both have means for interlock with the conveyor elements and for devices which are positioned along the conveyor to act on the work, I shall sometimes refer generically to the flasks and base frames as mold carriers.

I claim:

1. In a foundry conveyor system, the combination with a plurality of mold carriers comprising flasks provided with locating means, of a plurality of devices for acting successively on said carriers and a conveyor extending past said devices, each of a plurality of such devices having means cooperating with the locating means of said carriers for positioning the carriers accurately respecting the devices during the action of the devices thereon, and at least one of said devices comprises a transfer conveyor having flask clamping bars, the locating means of the flask and the cooperating means of the bars comprising sockets and dowels with which the flasks and bars are respectively provided.

2. The device of claim 1 in which the locating means of the flask and cooperating means of the bars are spaced longitudinally of the flask and the bars are provided with rotors for rotating the bars and flask to invert the flask.

3. In a foundry system, a conveyor having pattern placement, flask placement, fill and jolt, strike off, and squeeze stations; said conveyor comprising rollers in concentric inner and outer annular series, a rotor within the inner series of rollers and provided with propelling means, carrying frame plates individually detachably connected with said means, and means for the indexing advance of the rotor to propel respective plates on said rollers from station to station in which the said propelling means comprises upwardly extending dowels, the plates being provided with apertures in which the dowels are engaged during plate advance by said propelling means, means for effecting relative vertical movement between the plates and the dowels for engagement and disengagement of the connection of the plates with said rotor.

4. The device of claim 3 in which the means for effecting relative vertical movement comprises cross conveyor means including a section disposed between the inner and outer rolls of the first mentioned conveyor, said cross conveyor means being mounted on an elevator.

5. The device of claim 3 in which the means for effecting relative movement between the plates and dowels comprises lever means with which the dowels are connected for retraction and advance, the lever means being mounted on the rotor, and means for actuating the lever means in a direction to move the dowels to and from engagement in the apertures of the plates.

6. In a foundry conveyor system, the combination with roller conveyor means and a member movable thereon, of a propelling member movable along said conveyor means, dowel and socket means with which respective members are provided, and mechanism for retracting one of said means with respect to the other for disengaging the connection between said members.

7. The combination with annular conveyor means and a series of members operable thereon, of a propelling rotor centered in said means and having means for placing it in detachable driving connection individually with said members, ratchet teeth with which said rotor is provided, rotor index means comprising a ram having a piston-operable pawl engageable with said teeth and reciprocable for the step-by-step advance of said rotor and members, and of reciprocable dowel means and means for the actuation thereof alternately with said pawl, said rotor being provided with sockets in which said dowel means is engaged in one position of reciprocation, said dowel means locking said rotor with precision in successive position to which the rotor is indexed by the pawl.

8. The device of claim 7 in which the connections between the rotor and the respective members comprise retractable dowels mounted on the rotor, the members having sockets in which the dowels are receivable, the dowels having retracting levers and means for actuating said levers in a dowel retracting position to free said members from the rotor.

9. The device of claim 7 in which a succession of foundry machines are disposed along the path of advance of said members on said conveyor, the said machines being disposed in position to which successive members are advanced in successive indexing operations of said pawl.

10. The combination with a conveyor comprising spaced members, of a carrier plate mounted on said members and spanning the space therebetween, a jolt table provided with vibrating means and disposed between said members and having a table plate immediately beneath the carrier plate, means for lowering said members to deposit the carrier plate upon the table plate, and means providing a dowelled connection between said plates for accurately maintaining the carrier plate in registered position with the table plate during vibration.

11. In a foundry system, the combination with pattern plates, flask placement, flask filling, jolting, strikeoff, squeeze, drawing and closing mechanisms and conveyor means for mechanically advancing work from one to another of said mechanisms and to and from a pouring conveyor, of means for transferring to the pouring conveyor sand molds comprising cope and drag flasks, and unloading mechanism for removing molds and castings from the pouring conveyor, the unloading mechanism comprising a transverse conveyor track, a carriage mounted on the track, first and second receiving conveyor sections generally parallel to the pouring conveyor beneath said track, and first and second hoist means mounted on the track, the first hoist means comprising means for lifting filled molds and the contained casting from the pouring conveyor to be set out on the first receiving conveyor, the second hoist comprising means for withdrawing cope flasks from previously set out molds on the first output conveyor and placing said cope flasks on the second output conveyor, said carriage being movable to register the first hoist successively with the pouring conveyor and with the first output conveyor and concurrently to register the second hoist respectively with the first output conveyor and the second output conveyor.

12. The device of claim 11 in further combination with means for advancing drag flasks and castings along the first output conveyor following the removal of the cope flasks therefrom, clamp means for separately engaging the drag flasks and castings and inverting them to a higher level and in registry with the second output conveyor whereby to deposit the inverted drag flasks on the second output conveyor on which cope flasks are deposited by the second hoist means aforesaid, and means for independently lowering the clamp means engaged with the casting whereby to lower the casting while leaving its drag flask supported on the second output conveyor in an inverted position, and means for shaking out and returning the cope and drag flasks to the flask placement means aforesaid and for separately discharging the casting.

References Cited in the file of this patent

UNITED STATES PATENTS

| | | |
|---|---|---|
| 872,856 | Spence | Dec. 3, 1907 |
| 938,904 | Sherman | Nov. 2, 1909 |
| 1,159,707 | Peterson | Nov. 9, 1915 |
| 1,337,268 | Prince | Apr. 20, 1920 |
| 1,707,411 | Nicholls | Apr. 2, 1929 |
| 1,794,334 | Haskins | Feb. 24, 1931 |
| 2,049,967 | Luton | Aug. 4, 1936 |
| 2,068,835 | Wurster | Jan. 26, 1937 |
| 2,570,589 | Phillips | Oct. 9, 1951 |
| 2,588,669 | Taccone | Mar. 11, 1952 |
| 2,612,668 | Hutchison | Oct. 7, 1952 |
| 2,651,087 | Fellows | Sept. 8, 1953 |
| 2,718,679 | Lasater | Sept. 27, 1955 |
| 2,792,601 | Buhrer | May 21, 1957 |

FOREIGN PATENTS

| | | |
|---|---|---|
| 357,025 | Great Britain | Sept. 17, 1931 |
| 728,278 | Great Britain | Apr. 13, 1955 |